United States Patent [19]

Coran et al.

[11] 4,278,572

[45] Jul. 14, 1981

[54] PHENOLIC MODIFIED OLEFIN POLYMERS

[75] Inventors: Aubert Y. Coran; Raman Patel, both of Akron, Ohio

[73] Assignee: Monsanto Company, St. Louis, Mo.

[21] Appl. No.: 109,728

[22] Filed: Jan. 4, 1980

[51] Int. Cl.³ .................... C08L 7/00; C08L 61/10
[52] U.S. Cl. .................................. 260/3; 260/5; 525/133; 525/134; 525/145; 525/902
[58] Field of Search ............... 525/145, 134, 63, 902, 525/133; 260/5, 3

[56] References Cited

U.S. PATENT DOCUMENTS

| | | | |
|---|---|---|---|
| 2,240,582 | 5/1941 | Sparks | 525/145 |
| 3,093,613 | 6/1957 | Fusco et al. | 260/38 |
| 3,211,804 | 10/1965 | Baum et al. | 525/58 |
| 3,287,440 | 11/1966 | Giller | 260/28.5 R |
| 3,438,931 | 4/1969 | Mitchell et al. | 525/145 |
| 3,909,463 | 9/1975 | Hartman | 525/145 |

*Primary Examiner*—Theodore E. Pertilla
*Attorney, Agent, or Firm*—Larry R. Swaney

[57] ABSTRACT

Olefin polymers are described having methylol phenolic groups grafted thereto which modified polymers are useful for preparing improved polymer blends.

42 Claims, No Drawings

PHENOLIC MODIFIED OLEFIN POLYMERS

This application relates to improved polyolefin polymers, in particular, polyolefin polymers modified by reaction with methylol phenolic material.

BACKGROUND OF THE INVENTION

It is known that olefin polymers may be modified by reacting oxidized olefin polymer with a methylolated phenolic material, U.S. Pat. No. 3,211,804. In the known process, it is essential that the olefin polymer is oxidized to increase the carbonyl or peroxide content of the olefin polymer prior to reaction with the methylolated phenolic material. A disadvantage when using milder oxidizing agents such as air, is that long reaction times, i.e., 45 minutes or more, are required. Disadvantages when using peroxide as the oxidizing agent are that excessive crosslinking can result and polymer degradation can occur through chain scission especially with branched chain polymers such as polypropylene. Thus, it is desirable to provide olefin polymers modified with methylolated phenolic material without pre-oxidizing the olefin polymer.

SUMMARY OF THE INVENTION

Accordingly, it has now been discovered that alpha mono-olefin polymers having methylol phenolic groups grafted thereto may be prepared by the reaction of mono-olefin polymer with methylol phenolic material in the presence of activator. It is believed that the activator promotes graft formation in which the methylol phenolic material is linked through a methylene bridge to the olefin polymer. The resulting modified polymer has methylol phenolic groups grafted thereto. Some of the methylol phenolic groups may be pendant to the olefin polymr chain being attached by a single link, whereas, other methylol phenolic groups may form a link between two olefin polymer molecules.

The improved grafted olefin polymers of the invention may be conveniently prepared by masticating (by use of conventional plastic masticating equipment such as mills, Banbury mixers, or Twin Screw extruders, at a temperature above the melting point of the olefin polymer for a period of about 1-20 minutes) 0.1-20 parts by weight of methylol phenolic material, 100 parts by weight of an alpha mono-olefin polymer, and a graft forming amount of an activator. Typically, the methylol phenolic material contains about 1-30 weight percent of methylol groups ($—CH_2OH$). The activator is generally present in amounts of about 0.1-50 parts by weight per 100 parts by weight of methylol phenolic material. Preferred grafted polymers of the invention comprise mono-olefin polymer having methylol phenolic material grafted thereto prepared by the reaction of about 0.5-15 parts by weight methylol phenolic material containing about 2-15 weight percent methylol groups with 100 parts by weight of a thermoplastic polyethylene or polypropylene, in the presence of 0.005-4 parts by weight of an activator, preferably a Lewis Acid.

Suitable olefin polymers comprise amorphous or crystalline homopolymers or copolymers of $C_2$-$C_8$ alpha mono-olefins (alkenes). An important subgroup of satisfactory olefin polymer comprises crystalline, high molecular weight solid products from the polymerization of one or more mono-olefins by either high pressure or low pressure processes. Examples of such polymers are the isotactic or syndiotactic mono-olefin polymers representative members of which are commercially available. Examples of satisfactory olefins are ethylene, propylene, 1butene, 1-pentene, 1-hexene, 2-methyl-1-propene, 3-methyl-1-pentene, 4-methyl-1-pentene, 5-methyl-1-hexene, and mixtures thereof. Commercially available thermoplastic polyolefin resins and preferably polyethylene, polybutene-1, and polypropylene, or mixtures thereof, may be advantageously used in the practice of the invention with polypropylene being preferred. Also suitable for the practice of this invention are copolymers of two or more olefins, such as copolymers of ethylene and propylene which copolymers are preferred. Examples of suitable ethylene propylene copolymers are the commercially available ethylene propylene rubbers which generally contain a major portion of ethylene units. However, EPDM rubbers should be avoided because of their tendency to cure and scorch.

Any methylol phenolic material which will form a graft with olefin polymer may be used in the practice of the invention. Suitable methylol phenolic material may be prepared by condensation of an unsubstituted phenol, $C_1$-$C_{10}$ alkyl-p-substituted phenol or an halogen substituted phenol with an aldehyde, preferably formaldehyde, in an alkaline medium, or by condensation of phenol dialcohols. Methylol phenolic material includes polymeric phenols containing up to 10 benzene rings but preferred materials contain no more than three benzene rings. Especially preferred are methylol phenolic materials derived from dimethylol phenol substituted with $C_5$-$C_{10}$ alkyl groups preferably tertiary alkyl groups in the para position. Examples of satisfactory dimethylol phenolic materials are described in U.S. Pat. Nos. 2,972,600; 3,093,613; 3,287,440; 3,709,840, and 3,211,804, Column 5, lines 3-67, the disclosures of which are incorporated herein by reference. Halogenated, for example brominated, methylol phenolic materials are also suitable. These halogenated materials, at elevated temperatures in the presence of metal oxide such as zinc oxide, can form Lewis acid activators in situ. Suitable methylol phenolic materials are commercially available. For example, they may be purchased under the trade names of SP-1045, SP-1055, SP-1056, CRJ 352, and Arofene resins.

Any activator which promotes the graft formation between olefin polymer and methylol phenolic material is suitable for the practice of the invention. Preferred activators are Lewis acids which include the acid-acting metal halides such as boron trifloride, stannous chloride, zinc chloride, titanium tri- or tetrachloride, aluminum chloride, ferric chloride, ferric bromide, zinc bromide, aluminum bromide and complexes thereof. Suitable Lewis acids are described in U.S. Pat. No. 4,121,026, Columns 5-6, the disclosure of which is incorporated herein by reference.

The olefin polymers of the invention having methylol phenolic groups grafted thereto are especially useful for preparing improved polymer blends comprising polymers having an affinity for methylol phenolic groups. Thus, one embodiment of the invention comprises improved polymer blends comprising a blend of (a) about 1-99 parts by weight of an olefin polymer having methylol phenolic groups grafted thereto and (b) correspondingly, about 99-1 parts by weight of a polymer having an affinity for methylol phenolic groups. The methylol phenolic grafted olefin polymer is the same as described above. The second component of the improved blend can be any polymer having an affinity for methylol phenolic groups. In the sense as herein used, affinity means any attraction, whether chemical or physical, for methylol phenolic groups which enhances the compatibility between the two polymers. The second component polymer may exhibit an affinity for either methylol groups or hydroxy groups or both. The aforesaid affinity results in a polymer blend exhibiting improved properties, for example, higher tensile strength, greater elongation or better impact strength.

Examples of suitable polymer (b) are polyamides, polyolefins, polyesters, styrenic polymers such as polystyrene and styrene-acrylonitrile polymer (SAN), and hydrocarbon rubber. Preferred polyamides are nylons having a molecular weight of at least about 5,000 or more, preferably 10,000, comprising segments derived from dicarboxylic acid, diamine, lactam, or amino acid. Suitable thermoplastic polyamides (nylons) comprise crystalline or resinous, high molecular weight solid polymers including copolymers and terpolymers having recurring amide units within the polymer chain. Polyamides may be prepared by polymerization of one or more epsilon lactams, such as caprolactam, pyrrolidione, and amino undecanoic lactam, or amino acid, or by condensation of dibasic acids and diamines. Both fiber-forming and molding grade of nylons are suitable. Examples of such polyamides are polycaprolactam (nylon-6), polylauryllactam (nylon-12), polyhexamethyleneadipamide (nylon-6,6), polyhexamethyleneazelamide (nylon-6,9), polyhexamethylenesebacamide (nylon-6,10), polyhexamethyleneisophthalamide (nylon-6, IP) and the condensation product of 11-aminoundecanoic acid (nylon-11). Additional examples of satisfactory polyamides are described in Kirk-Othmer, *Encyclopedia of Chemical Technology,* Vol. 10, page 919 and *Encyclopedia of Polymer Science and Technology,* Vol. 10, pages 392–414. Commercially available thermoplastic polyamide may be advantageously used in the practice of the invention, with linear crystalline polyamide having a softening point or melting point between 160°–230° C. being preferred.

Suitable thermoplastic polyesters comprise linear, crystalline, high molecular weight solid polymers having recurring

groups including

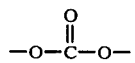

groups within the polymer chain. The term "linear" as used herein in respect to polyester means a polymer in which the recurring ester groups are within the polymer backbone and not pendant therefrom. Linear crystalline polyesters having a softening point above 50° C. are satisfactory with polyesters having a softening point or melting point above 100° C. being preferred with polyesters having a softening point of melting point between 160°–260° C. being more preferred. Saturated linear polyesters (free of olefinic unsaturation) are preferred. Many commercially available thermoplastic linear crystalline polyesters may be advantageously employed in the practice of the invention or they may be prepared by polymerization of one or more dicarboxylic acids, anhydrides, or esters and one or more diol. Examples of satisfactory polyesters include poly(trans-1,4-cyclohexylene $C_{2-6}$ alkane dicarboxylates) such as poly(trans-1,4-cyclohexylene succinate) and poly(trans-1,4-cyclohexylene adipate), poly(cis or trans-1,4-cyclohexanedimethylene) $C_{0-2}$ alkanedicarboxylates such as poly(cis-1,4-cyclohexanedimethylene)oxalate and poly(cis-1,4-cyclohexanedimethylene)succinate, poly($C_{2-4}$ alkylene terephthalates) such as polyethyleneterephalate and polytetramethyleneterephthalate, poly($C_{2-4}$ alkyleneterephthalates) such as polyethyleneterephthalate and polytetramethyleneterephthalate, poly($C_{2-4}$ alkylene isophthalates such as polyethyleneisophthalate and polytetramethyleneisophthalate, poly(p-phenylene $C_{1-8}$ alkanedicarboxylates) such as poly(p-phenylene glutarate) and poly(p-phenylene adipate), poly(p-xylene oxalate), poly(o-xylene oxalate), poly(p-phenylenedi-$C_{1-5}$ alkylene terephthalates) such as poly(p-phenylenedimethylene terephthalate) and poly(p-phenylene-di-1,4-butylene terephthalate, poly($C_{2-10}$ alkylene-1,2-ethylenedioxy 4,4'-dibenzoates) such as poly(ethylene-1,2-ethylenedioxy-4,4'-dibenzoate), poly(tetramethylene-1,2-ethylenedioxy-4,4'-dibenzoate) and poly(hexamethylene-1,2-ethylenedioxy-4,4'-dibenzoate), poly($C_{3-10}$ alkylene-4,4'-dibenzoates) such as poly(pentamethylene-4,4'-dibenzoate), poly(hexamethylene-4,4'-dibenzoate and poly(decamethylene-4,4'-dibenzoate), poly($C_{2-10}$ alkylene-2,6-napthalene dicarboxylate) such as poly(ethylene-2,6-napthalene dicarboxylate), poly(trimethylene-2,6-napthalene dicarboxylate) and poly(tetramethylene-2,6-napthalene dicarboxylates), and poly($C_{2-10}$ alkylene sulfonyl-4,4'-dibenzoates) such as poly(octamethylene sulfonyl-4,4-dibenzoate) and poly(decamethylene sulfonyl-4,4'-dibenzoate. Additional examples of satisfactory linear polyesters are described in *Encyclopedia of Polymer Science and Technology,* Vol. 11, pages 68–73 and Korshak & Vinogradova *Polyesters,* Pergammon Press, pages 31–64. The disclosures thereof are hereby incorporated by reference. Suitable polycarbonates are also commercially available. For suitable segmented poly(ether-co-phthalates) see page 461, *Rubber World Blue Book,* supra. Polylactones such as polycaprolactone are satisfactory in the practice of the invention. Preferred polyesters of the invention are derived from aromatic dicarboxylic acids such as napthalenic or phthalic acids. More preferred polyesters are poly(alkylene terephthalates) especially poly(tetramethylene terephthalate), or mixed polyphthalates derived from two or more glycols, two or more phthalic acids, or two or more glycols and two or more phthalic acids such as poly(alkylene tere-co-isophthalates).

Suitable styrenic polymers comprise homopolymers of styrene (polystyrene) or copolymers of styrene and acrylonitrile, preferably of sufficient molecular weight so that the polymers are in the form of thermoplastic resins. Polystyrene resins (PS) are high molecular weight solid products prepared by the polymerization of styrene by known processes and are readily available items of commerce. Styrene/acrylonitrile resins (SAN) are high molecular weight solid products from the polymerization of mixtures of monomers comprising styrene and acrylonitrile. SAN resins are items of commerce readily prepared by known processes, for example, by emulsion polymerization as described in U.S. Pat. No. 2,140,048. The proportion of styrene monomer may vary from 30–85 weight percent, and, correspondingly, the proportion of acrylonitrile monomer may vary from 70-15 weight percent, however, resins containing 50 weight percent or more styrene monomer are preferred. SAN resins containing 20-40 weight percent acrylonitrile monomer are especially preferred.

Any hydrocarbon rubber is suitable for the preparation of the blends of the invention. Hydrocarbon rubber comprises an essentially random, noncrystalline, rubbery homopolymer or copolymer of one or more mono- or diolefins. Rubbery polymers of 1,3-butadiene, isobutylene and isoprene and their copolymers with styrene or methylstyrene are suitable. Also suitable are polynorbornene rubber and polyalkenamer rubber. Rubber polymers of two or more alpha mono-olefins polymerized with up to 10 percent of a non-conjugated diene are also suitable. Commercially available rubbers suitable for the practice of the invention are described in *Rubber World Blue Book*, 1975 Edition, Materials and Compounding Ingredients for Rubber as Follows: Natural Rubber, pages 389-394, EP Rubber, page 403, EPDM Rubber, pages 406-410, Butyl Rubber, pages 411-414, Polybutadiene Rubber, pages 431-432, Polyisobutylene Rubber, page 438, Polyisoprene Rubber, pages 439-440, and Styrene Butadiene Rubber, pages 452-460.

The improved polyolefin blends may be prepared by mixing preferably above the melting point or softening point of each of the polymers using conventional masticating equipment, for example, rubber mill, Brabender Mixer, Banbury Mixer, or Twin Screw Continuous Mixer Extruder. Mixing times necessary to obtain a homogeneous blend are satisfactory. If the polymer blend is obviously nonhomogeneous, additional mixing is required. When the blend components are thoroughly mixed, improved properties result.

Another embodiment of the invention relates to an improved compatibilized polymer blend comprising a blend of (a) an olefin polymer, (b) a polymer different from polymer (a), said polymer (b) having an affinity for a methylol phenolic material and (c) in an amount sufficient to enhance the compatibility between polymers (a) and (b), an olefin polymer having methylol phenolic groups grafted thereto by links of the type formed in the presence of acidic activator. Typically, the improved compatibilized polymer blend comprises abot 1-99 parts by weight of polymer (a) and corresponding, about 99-1 parts by weight of polymer (b) and about 1-20 parts by weight of polymer (c) per 100 parts by weight of polymer (a). Preferably, the olefin polymers of (a) and (c) are selected from the group consisting of thermoplastic crystalline polyethylene, thermoplastic crystalline polypropylene and amorphous ethylene-propylene copolymer. The improved polymer blends are prepared by masticating the three polymers using conventional rubber masticating equipment. A sufficient amount of polymer (c) must be used to enhance the compatibility between polymers (a) and (b). When sufficient polymer (c) is used, the affinity for the methylol phenolic groups by polymer (b) results in improved polymer blends. The polymer (a) and polymer (b) can be polymers which normally are completely or partially incompatible, but by the use of polymer (c) the incompatibility is substantially reduced resulting in a compatibilized polymer blend which exhibits improved properties.

When polymer (a) and polymer (b) are present in about equal proportions, the polymer blend may contain two coexisting continuous phases. When either of the polymers is present in a significantly major proportion (e.g. 2 or more times the amount of the other), the major component usually becomes the matrix continuous phase and the minor component is present as dispersed discrete small particles of the size of about 0.01 to 50 microns, preferably between about 0.05 to 10 microns. The presence of the compatibilizing polymer (c) can result in a more homogeneous blend containing a greater number of small sized dispersed polymer particles, and accounts for the improved mechanical properties of the resulting blend.

The blend compositions of the invention are useful for making a variety of molded, extruded, or calendered articles. They are particularly useful in making articles by extrusion, injection molding, and injection molding techniques. The properties of the modified blend depend upon the proportions of the components in the blend with a wide range of properties available simply by varying the proportions of the polymer components.

The stress-strain properties of the composition are determined in accordance with ASTM test procedures. Tests are carried out using a Microdumbbell tensile test specimen (ASTM D1708-66) having a test length of 0.876 inches (2.23 cm). An Instron tensile tester was used to pull the specimens apart during the test for tensile strength and, ultimate elongation. The tester is designed to measure changes in jaw separation in inches. Though the initial jaw separation was adjusted to the ASTM procedure, to 0.90 inches (2.29 cm.) and the specimen length and jaw separation are not 1.00 inches (2.54 cm.), the elongation at break was read as the jaw separation increase in inches. The percent ultimate elongation or elongation at break was calculated by multiplying the change in jaw separation required to break the specimen (measured in inches) by 100. It is true that the original unstrained sample length was 0.876 inches (not 1.00 inches) and one might expect that the change (in inches) in jaw separation should be divided by 0.876 inches as well as being multiplied by 100. However, it is also true that some flow of the specimen occurs in the jaws, which flow, in effect, somewhat increases the initial or unstrained length. Since the effective length change due to flow of the specimen in the jaws is difficult to measure in each case, and since the effect of this is in the opposite direction of not dividing by 0.876, it was found expedient to estimate the percent ultimate elongation or elongation at break, merely by multiplying the jaw separation to break (measured in inches) by 100. The actual value may deviate from this somewhat, however, the method presented herewith is incorporated into the definition for percent elongation used herein. Test specimens are pulled at 2.5 cm. per minute up to 30 percent elongation and 25.4 cm. per minute to failure.

DESCRIPTION OF PREFERRED EMBODIMENTS

The compositions of the invention are prepared by masticating the components in a Brabender Mixer at the oil bath temperatures and mixing speeds indicated below. All parts are by weight.

To prepare polypropylene having methylol phenolic groups grafted thereto, 100 parts of polypropylene (Profax 6723) are charged to the mixer and masticated at 80 rpm with an oil bath temperature of about 180° C. After the polypropylene is molten, 2 parts of dimethylol-p-octylphenol (SP-1045) are added and mixing is continued for 2 minutes. Activator, 0.4 parts of stannous chloride dihydrate, is then added and mixed for 3 more minutes. Lastly, 0.07 parts of magnesium oxide is added (to neutralize any free acid) and the batch is mixed for one additional minute. The mass is then removed and passed through a mill to form a sheet. The material is designated grafted PP-1.

To prepare polyethylene having methylol phenolic groups grafted thereto, 100 parts of high density polyethylene (Marlex EHM 6006) are charged to the mixer and masticated at 80 rpm at about 185°–190° C. Four parts of dimethylol-p-octylphenol are added and mixing is continued for one minute. Activator, 0.8 parts of $SnCl_2.2H_2O$, is then added and mixed for 3 additional minutes. Magnesium oxide, 0.32 parts, is added and mixed for one minute. The product, designated PE-1, is then removed.

Polymer blends are prepared by masticating polymers in a Brabender Mixer at 80 rpm with an oil bath temperature of about 225° C. for Stocks 1–6 and of about 180° C. for Stocks 7–8. A mixture is masticated for 3 minutes after the polymers are melted. The blend is removed from the mixer and cooled, then it is returned to the mixer and melt mixed for two additional minutes. Test specimens are prepared by compression molding the blend at 250° C. for Stocks 1–6 and at 225° C. for Stocks 7–8. Control stocks are prepared using virgin polypropylene or polyethylene. Polyester blends are prepared using poly(tetramethyleneterephthalate) m.p. 225°–226° C. (designated PTMT). Nylon blends are prepared using nylon 6,66 copolymer m.p. 213° C. (designated Nylon 6,66). Styrene-acrylonitrile polymer blends are prepared using styrene-acrylonitrile copolymer (about 23% acrylonitrile, melt index 7.5) purchased as Lustran DN52 SAN resin (designated SAN). The properties are shown in Table 1.

The data show that the blends containing polyolefin having methylol phenolic groups grafted thereto exhibit substantial improvements in properties including increases in tensile strength and true stress at break. The property improvement is indicative of enhanced compatibility between the two polymers.

Polymer blends comprising rubber and grafted polypropylene are prepared by masticating the polymers in a Brabender Mixer at 80 rpm at about 180° C. for two minutes after the grafted polypropylene is melted. The blend is removed from the mixer and cooled, it is then returned to the mixer and melt mixed for two additional minutes. Test specimens are prepared by compression molding the blend at about 220° C. Control stocks are prepared using virgin polypropylene. EPDM rubber blends are prepared using ethylene-polypropylene-norbornene terpolymer rubber (Epsyn 70A). Natural rubber blends are prepared using smoked sheet No. 5 natural rubber. The properties are shown in Table 2.

The data show that blends containing polypropylene having methylol phenolic groups grafted thereto exhibit substantial improvements in properties including increases in tensile strength and true stress at break, the improvements being indicative of enhanced compatibility between the polymers.

TABLE 1

|  | 1 | 2 | 3 | 4 | 5 | 6 | 7 | 8 |
|---|---|---|---|---|---|---|---|---|
| Polypropylene | 50 | — | 50 | — | — | — | 50 | — |
| Polyethylene | — | — | — | — | 50 | — | — | — |
| Grafted PP-1 | — | 50 | — | 50 | — | — | — | 50 |
| Grafted PE-1 | — | — | — | — | — | 50 | — | — |
| PTMT | 50 | 50 | — | — | — | — | — | — |
| Nylon 6,66 | — | — | 50 | 50 | 50 | 50 | — | — |
| SAN | — | — | — | — | — | — | 50 | 50 |
| Properties |  |  |  |  |  |  |  |  |
| TS, MPa | 21.9 | 33.2 | 20.2 | 38.3 | 33.2 | 42.3 | 15.0 | 23.5 |
| E, MPa | 1066 | 1274 | 1118 | 1133 | 1627 | 1576 | 920 | 1094 |
| Elong., % | 7 | 8 | 12 | 17 | 6 | 8 | 9 | 5 |
| TSB, MPa | 23.4 | 35.9 | 22.6 | 44.8 | 35.2 | 45.7 | 16.4 | 24.7 |

TABLE 2

|  | 1 | 2 | 3 | 4 |
|---|---|---|---|---|
| Polypropylene | 50 | — | 50 | — |
| Grafted PP-1 | — | 50 | — | 50 |
| EPDM Rubber | 50 | 50 | — | — |
| Natural Rubber | — | — | 50 | 50 |
| Properties |  |  |  |  |
| TS, MPa | 7.7 | 9.5 | 8.4 | 11.1 |
| $M_{100}$, MPa | 7.3 | 8.7 | 7.2 | 8.4 |
| E, MPa | 154 | 93 | 123 | 138 |
| Elong., % | 230 | 270 | 310 | 470 |
| Tension Set, % | 80 | 59 | 79 | 75 |
| TSB, MPa | 25.4 | 35.2 | 34.4 | 63.3 |

Methylol phenolic grafted olefin polymers of the invention contain reactive sites for bonding to a variety of substrates. Depending upon the substrate, another agent may be required to link these reactive sites to the substrates.

Enhanced compatability is achieved in polymer blends in which the methylol phenolic grafted olefin polymer contains as little as 0.01 weight percent of methylol phenolic groups. Preferred grafted polymers of the invention contain between 0.1 and 10 weight percent of methylol phenolic groups.

Although the invention has been illustrated by typical examples, it is not limited thereto. Changes and modifications of the examples of the invention herein chosen for purposes of disclosure can be made which do not constitute departures from the spirit and scope of the invention.

The embodiments of the invention in which the exclusive property or privilege is claimed are defined as follows:

1. A mono-olefin polymer having methylol phenolic groups grafted thereto by links of the type formed by the reaction of mono-olefin polymer and methylol phenolic material in the presence of an activator.

2. The polymer of claim 1 in which the olefin polymer is a polymer of $C_2$–$C_8$ alkene and the methylol phenolic groups are derived from material containing about 1–30 weight percent methylol groups.

3. The polymer of claim 2 which comprises the reaction product of about 0.1–20 parts by weight of a methylol phenolic material and 100 parts by weight of olefin polymer in which the grafting reaction is carried out in the presence of a graft forming amount of an acidic activator.

4. The polymer of claim 3 which comprises the reaction product of 0.5–15 parts by weight of a methylol p-alkyl phenolic material containing about 2–15 weight percent methylol groups and 100 parts by weight of thermoplastic crystalline polypropylene.

5. The polymer of claim 3 which comprises the reaction product of 0.5–15 parts by weight of methylol p-alkyl phenolic material containing about 2–15 weight percent methylol groups and 100 parts by weight of thermoplastic crystalline polyethylene.

6. The polymer of claim 3 which comprises the reaction product of 0.5–15 parts by weight of methylol p-alkyl phenolic material containing about 2–15 weight percent methylol groups and 100 parts by weight of thermoplastic ethylene-propylene copolymer.

7. The polymer of claim 3 in which the phenolic material is derived from dimethylol-p-$C_1$–$C_{10}$ alkylphenol.

8. The polymer of claim 7 in which the grafting reaction is carried out in the presence of 0.1–50 parts by weight of a Lewis acid per 100 parts by weight of methylol phenolic material.

9. The polymer of claim 8 in which the Lewis acid is stannous chloride.

10. The polymer of claim 7 in which the phenolic material is brominated to contain 2–10 weight percent bromine.

11. The polymer of claim 7 in which the phenolic material is derived from dimethylol-p-octylphenol.

12. An improved polymer blend comprising a blend of (a) about 1–99 parts by weight of a mono-olefin polymer having methylol phenolic groups grafted thereto by links of the type formed by the reaction of mono-olefin polymer and methylol phenolic material in the presence of acidic activator and (b) correspondingly, about 99–1 parts by weight of a polymer having an affinity for methylol phenolic groups.

13. The blend of claim 12 in which polymer (a) is the reaction product of 0.1–20 parts by weight of a methylol phenolic material containing about 1–30 weight percent methylol groups and 100 parts by weight of a polymer of a $C_2$–$C_8$ alkene in which the grafting reaction is carried out in the presence of a graft forming amount of an acidic activator.

14. The blend of claim 13 in which polymer (b) is a plastic polymer selected from the group consisting of polyamide, polyolefin, polyester, polystyrene, styrene-acrylonitrile polymer and rubber.

15. The blend of claim 14 in which polymer (a) is grafted polyethylene or grafted polypropylene.

16. The blend of claim 15 in which polymer (b) is a polyamide having a molecular weight of at least about ten thousand comprising segments derived from dicarboxylic acid, diamine, lactam, or amino acids.

17. The blend of claim 15 in which polymer (b) is a polyolefin.

18. The blend of claim 15 in which polymer (b) is a polyester.

19. The blend of claim 15 in which polymer (b) is a rubber.

20. The blend of claim 16 comprising about 5–30 parts by weight of grafted polypropylene and about 70–95 parts by weight of nylon.

21. The blend of claim 20 in which the phenolic material is derived from dimethylol-p-$C_1$–$C_{10}$ alkyl-phenol.

22. A compatibilized polymer blend comprising a blend of (a) an olefin polymer, (b) a polymer selected from the group consisting of polyamide, polyester, polystyrene, styrene-acrylonitrile polymer and rubber, and (c) in an amount sufficient to enhance the compatibility between polymer (a) and polymer (b), a mono-olefin polymer having a methylol phenolic group grafted thereto by links of the type formed by the reaction of mono-olefin polymer and methylol phenolic material in the presence of activator.

23. The blend of claim 22 comprising about 1–99 parts by weight of polymer (a) and, correspondingly about 99–1 parts by weight of polymer (b), and about 1–20 parts by weight of polymer (c) per 100 parts by weight of polymer (a).

24. The blend of claim 22 in which polymer (a) is thermoplastic crystalline polypropylene.

25. The blend of claim 22 in which polymer (a) is thermoplastic crystalline polyethylene.

26. The blend of claim 22 in which polymer (a) is ethylene-propylene copolymer.

27. The blend of claim 24 in which the phenolic material is derived from dimethylol-p-$C_1$–$C_{10}$ alkylphenol.

28. The blend of claim 27 in which the grafted olefin polymer of (c) is thermoplastic crystalline polypropylene.

29. The blend of claim 28 in which polymer (b) is a plastic polymer selected from the group consisting of polyamide, polyolefin, polyester, polystyrene, styrene-acrylonitrile polymer, and rubber.

30. The blend of claim 29 in which polymer (b) is a polyamide having a molecular weight of at least about ten thousand comprising segments derived from dicarboxylic acid, diamine, lactam, or amino acid.

31. The blend of claim 28 in which polymer (b) is rubber.

32. The blend of claim 29 in which polymer (b) is rubber.

33. A process for preparing olefin polymer having methylol phenolic groups grafted thereto which comprises causing about 0.1–20 parts by weight of a methylol phenolic material containing about 1–30 weight percent methylol groups, to react with 100 parts by weight of mon-olefin polymer in the presence of a graft forming amount of an activator.

34. The process of claim 33 which comprises causing about 0.5–15 parts by weight of a methylol-p-alkyl-phenolic material containing about 2–15 weight percent methylol groups to react with 100 parts by weight of olefin polymer.

35. The process of claim 34 which comprises carrying out the reaction in the presence of 0.1–50 parts by weight of a Lewis acid activator per 100 parts by weight of methylol phenolic material.

36. The process of claim 35 in which the mono-olefin polymer is selected from the group consisting of polyethylene, polypropylene and ethylene-propylene copolymer.

37. The process of claim 36 in which the methylol phenolic material is derived from a dimethylol-p-$C_1$–$C_{10}$ alkyl-phenol.

38. The process of claim 37 in which the methylol phenolic material is derived from a dimethylol-p-octyl-phenol.

39. The process of claim 37 in which the Lewis acid activator is stannous chloride.

40. The process of claim 37 in which the olefin polymer is thermoplastic crystalline polypropylene.

41. The process of claim 37 in which the olefin polymer is thermoplastic crystalline polyethylene.

42. The process of claim 37 in which the olefin polymer is ethylene-propylene copolymer.

* * * * *